(12) United States Patent
Jung et al.

(10) Patent No.: US 9,098,952 B2
(45) Date of Patent: Aug. 4, 2015

(54) METHOD AND SYSTEM FOR INFORMING FUEL EFFICIENT DRIVING

(71) Applicant: Hyundai Motor Company, Seoul (KR)

(72) Inventors: Woochul Jung, Seoul (KR); Young Woo Choi, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/142,871

(22) Filed: Dec. 29, 2013

(65) Prior Publication Data

US 2015/0052987 A1 Feb. 26, 2015

(30) Foreign Application Priority Data

Aug. 21, 2013 (KR) .......................... 10-2013-0099150

(51) Int. Cl.
*G01F 9/00* (2006.01)
*G07C 5/00* (2006.01)
*B60W 10/00* (2006.01)

(52) U.S. Cl.
CPC . *G07C 5/00* (2013.01); *B60W 10/00* (2013.01)

(58) Field of Classification Search
CPC ........ G07C 5/008; G07C 5/085; G07C 5/006; G07C 5/0858; G07C 5/0883; G07C 5/00; B60W 10/06; B60W 10/08; B60W 10/00; G06F 17/00; Y02T 10/52; B60R 16/0236
USPC ...................................................... 73/114.53
See application file for complete search history.

(56) References Cited

U.S. PATENT DOCUMENTS

| | | | |
|---|---|---|---|
| 8,190,325 B2 * | 5/2012 | Crombez | 701/36 |
| 8,509,987 B2 * | 8/2013 | Resner | 701/33.3 |
| 8,606,459 B2 * | 12/2013 | Sekiyama et al. | 340/425.5 |
| 8,645,052 B2 * | 2/2014 | Pryakhin et al. | 701/123 |
| 8,781,659 B2 * | 7/2014 | Kim | 701/22 |
| 8,786,420 B2 * | 7/2014 | Marumoto | 340/441 |
| 8,880,285 B2 * | 11/2014 | Miners et al. | 701/33.9 |
| 8,892,341 B2 * | 11/2014 | McClellan | 701/115 |
| 2011/0254676 A1 * | 10/2011 | Marumoto | 340/441 |
| 2013/0166118 A1 * | 6/2013 | Kim | 701/22 |
| 2013/0275013 A1 * | 10/2013 | Kote et al. | 701/51 |

FOREIGN PATENT DOCUMENTS

| | | |
|---|---|---|
| JP | 2011081558 A | 4/2011 |
| KR | 10-2009-0065726 A | 6/2009 |
| KR | 10-2010-0122224 A | 11/2010 |
| KR | 10-2010-0124555 | 11/2010 |
| KR | 10-2011-0096792 | 8/2011 |
| KR | 10-2012-0062535 A | 6/2012 |

* cited by examiner

*Primary Examiner* — Freddie Kirkland, III
(74) *Attorney, Agent, or Firm* — Mintz Levin Cohn Ferris Glovsky and Popeo, P.C.; Peter F. Corless

(57) ABSTRACT

A method and system for informing fuel efficient driving are provided. The method includes collecting, by a controller, vehicle context data that includes fuel consumption per second and calculating a fuel efficiency influencing factor that includes a driving time after starting an engine based on the vehicle context data. The fuel efficiency influencing factor is stored in a database and a driving propensity of a driver is analyzed based on the data stored in the database. Further, fuel efficiency analysis data that includes a fuel efficient driving index is produced a fuel efficiency analysis result based on the fuel efficiency analysis data is displayed.

14 Claims, 7 Drawing Sheets

METHOD AND SYSTEM FOR INFORMING FUEL EFFICIENT DRIVING

CROSS-REFERENCE TO RELATED APPLICATION

This application claims priority to and the benefit of Korean Patent Application No. 10-2013-0099150 filed in the Korean Intellectual Property Office on Aug. 21, 2013, the entire contents of which are incorporated herein by reference.

BACKGROUND (a) Field of the Invention

The present invention relates to a method and a system for informing fuel efficient driving, and more particularly, to a method and a system for informing fuel efficient driving which analyze a driving propensity of a driver and display a fuel efficiency analysis result.

(b) Description of the Related Art

Drivers today are interested in fuel efficiency due to the rapid increase in oil prices. As the interest in the fuel efficiency increases, various technologies for improving the fuel efficiency are being developed. For example, an idle stop and go (ISG) device which stops an engine when a vehicle stops and starts the engine when the vehicle begins to run has been developed. However, even though a technology of improving fuel efficiency is applied to a vehicle, an effect of improving fuel efficiency may not be sufficient when a significant between a driving propensity of the driver and fuel efficient driving exists.

In general, drivers tend to have different driving propensities. Therefore, even though the vehicle types may be the same, fuel efficiency of the vehicles may be differ based on the driving propensity of the driver. For example, when a driver frequently performs rapid acceleration and rapid deceleration, fuel consumption increases. In addition, since the driving propensity of the driver is not always uniform, but may be based on changes such as the mood of the driver, sudden changes in the driving intention, or a road condition, fuel efficiency also changes. Therefore, it may be difficult to modify the driving propensity of the driver to improve the fuel efficiency by simply informing the driver of the present fuel efficiency.

The above information disclosed in this section is merely for enhancement of understanding of the background of the invention and therefore it may contain information that does not form the prior art that is already known in this country to a person of ordinary skill in the art.

SUMMARY

The present invention provides a method and a system for informing fuel efficient driving which analyze a driving propensity of a driver based on a fuel efficiency influencing factor by which the driving propensity of the driver may be recognized and display a fuel efficiency analysis result, to provide the fuel efficient driving of the driver.

An exemplary embodiment of the present invention provides a method for informing fuel efficient driving that may include: collecting vehicle context data that includes fuel consumption per second; calculating a fuel efficiency influencing factor that includes a driving time after starting an engine based on the vehicle context data; storing the fuel efficiency influencing factor in a database; analyzing a driving propensity of a driver based on the data accumulated in the database and producing fuel efficiency analysis data that includes a fuel efficient driving index; and displaying a fuel efficiency analysis result based on the fuel efficiency analysis data.

The method for informing the fuel efficient driving according to the exemplary embodiment of the present invention may further include: producing first comparison data by comparing the fuel efficiency analysis data of the driver and the fuel efficiency analysis data of drivers having the same type of vehicles; and displaying the fuel efficiency analysis result based on the fuel efficiency analysis data and the first comparison data.

In addition, the method may include: producing second comparison data by comparing the fuel efficiency analysis data of the driver and the fuel efficiency analysis data of a plurality of drivers; and displaying the fuel efficiency analysis result based on the fuel efficiency analysis data and the second comparison data.

The method for informing the fuel efficient driving according to the exemplary embodiment of the present invention may further include: displaying a warning based on the fuel efficiency analysis data and a predetermined reference value, which may be a reference for determining the fuel efficient driving, when a driving state of the driver is not a fuel efficient driving state. In addition, the fuel efficiency influencing factor may further include at least one of an idling time, a preheating time, a rapid acceleration time, a rapid deceleration time, and a driving distance after starting the engine, and the driving time after starting the engine may be divided into n pieces based on the fuel consumption per second. When the driving time after starting the engine is divided into a first time, a second time, and a third time based on the fuel consumption per second, the fuel efficiency analysis data may further include a first time ratio, a second time ratio, and a third time ratio.

The fuel efficiency analysis data may further include at least one of an idling time ratio, a preheating time ratio, a rapid acceleration time ratio, and a rapid deceleration time ratio. The fuel efficient driving index may be calculated based on the first time, the second time, the third time, the idling time, and an indexation reference coefficient, and the indexation reference coefficients may be set differently based on the first time, the second time, and the third time.

Another exemplary embodiment of the present invention provides a system for informing fuel efficient driving that may include: a driver terminal configured to calculate a fuel efficiency influencing factor that includes a driving time after starting an engine, and transmit the fuel efficiency influencing factor to the exterior; and a management server configured to receive the fuel efficiency influencing factor, analyze a driving propensity of a driver based on data accumulated in a database, and produce fuel efficiency analysis data that includes a fuel efficient driving index, in which the management server provides the fuel efficiency analysis data via at least one of the driver terminal and a web page.

The driver terminal may include: a data collector configured to collect vehicle context data that includes fuel consumption per second; a vehicle context data manager configured to selectively collect data by which the driving propensity of the driver may be determined among the vehicle context data, and calculate the fuel efficiency influencing factor; a communicator configured to transmit the fuel efficiency influencing factor to the management server; an output display configured to display a fuel efficiency analysis result; and a terminal controller configured to operate the output display to display the fuel efficiency analysis result based on the fuel efficiency analysis data.

The terminal controller may be configured to display a warning by operating the output display based on the fuel efficiency analysis data and a predetermined reference value, which may be a reference for determining the fuel efficient driving, when a driving state of the driver is not a fuel efficient driving state. Further, the management server may include: a communication unit configured to perform wireless communication with the communicator; an authentication unit configured to perform driver authentication; a database configured to store the fuel efficiency influencing factor; a driving propensity analyzing unit configured to analyze the driving propensity of the driver based on the data accumulated in the database and produce the fuel efficiency analysis data; and a controller configured to operate the communication unit to transmit the fuel efficiency analysis data to the driver terminal.

The management server may further include a driving propensity comparing unit configured to produce first comparison data by comparing the fuel efficiency analysis data of the driver and the fuel efficiency analysis data of drivers having the same type of vehicles and produce second comparison data by comparing the fuel efficiency analysis data of the driver and the fuel efficiency analysis data of a plurality of drivers.

The fuel efficiency influencing factor may further include at least one of an idling time, a preheating time, a rapid acceleration time, a rapid deceleration time, and a driving distance after starting an engine, and the vehicle context data manager may be configured to divide the driving time after starting the engine into n pieces based on the fuel consumption per second.

When the driving time after starting the engine is divided into a first time, a second time, and a third time based on the fuel consumption per second, the fuel efficiency analysis data may further include at least one of a first time ratio, a second time ratio, a third time ratio, an idling time ratio, a preheating time ratio, a rapid acceleration time ratio, and a rapid deceleration time ratio. The driving propensity analyzing unit may be configured to calculate the fuel efficient driving index based on the first time, the second time, the third time, the idling time, and a predetermined indexation reference coefficient.

Figure 1:
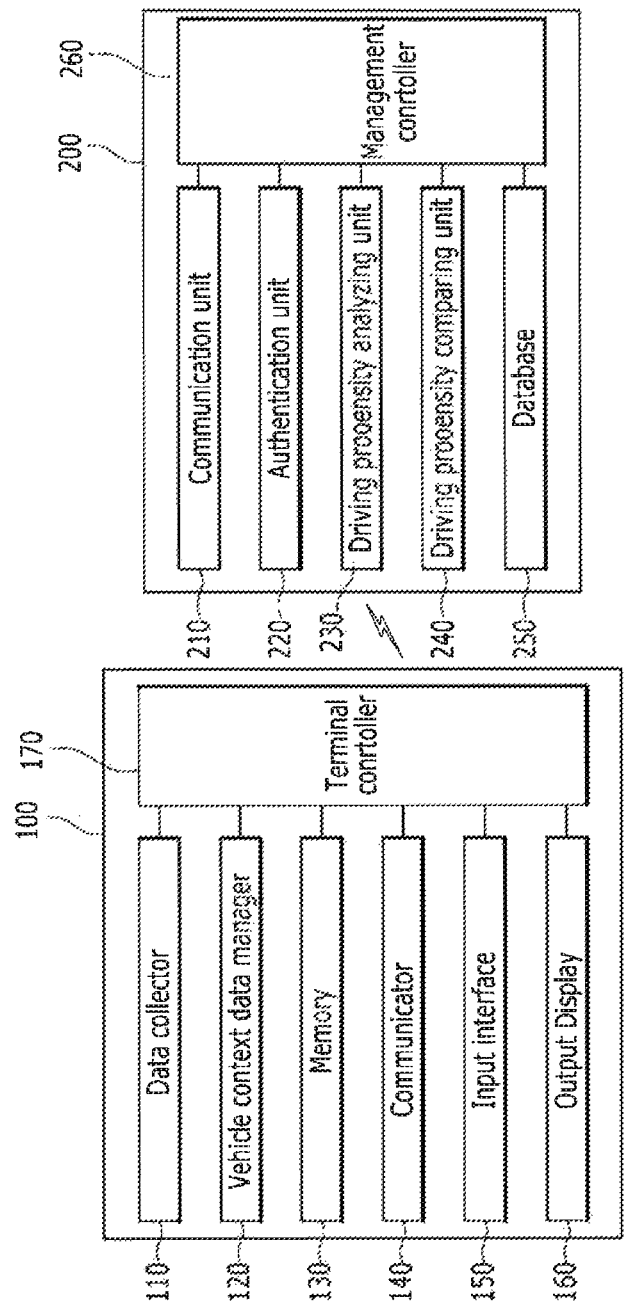
FIG. 1 is an exemplary block diagram of a system for informing fuel efficient driving according to an exemplary embodiment of the present invention.

| Description of symbols | |
|---|---|
| 100: Driver terminal | 110: Data collector |
| 120: Vehicle context data manager | 130: Memory |
| 140: Communicator | 150: Input interface |
| 160: Output display | 170: Terminal controller |
| 200: Management server | 210: Communication unit |
| 220: Authentication unit | 230: Driving propensity analyzing unit |
| 240: Driving propensity comparing unit | 250: Database |
| 260: Controller | |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. However, the present invention is not limited to the exemplary embodiments described herein, and may be implemented in various different forms.

FIG. 1 is an exemplary block diagram of a system for informing fuel efficient driving regarding fuel efficiency according to an exemplary embodiment of the present invention. Referring to FIG. 1, a system for informing fuel efficient driving according to an exemplary embodiment of the present invention may include a driver terminal 100 executed by a terminal controller and a management server 200 executed by a first controller. The management server 200 may be a cloud server configured to provide a cloud service.

The driver terminal 100 may be a wireless communication device such as a telematics terminal, a smart phone, a tablet personal computer (PC), or a personal digital assistant (PDA). The driver terminal 100 may include a data collector 110, a vehicle context data manager 120, a memory 130, a communicator 140, an input interface 150, an output display 160, and a terminal controller 170 configured to execute the other elements of the driver terminal 100.

In particular, the data collector 110 may be configured to collect vehicle context data from an electronic control unit (ECU), a body control module (BCM), a cluster, a navigation system, a power train, and the like, which may be installed within a vehicle. The vehicle context data collected by the data collector 110 may be transmitted to the vehicle context data manager 120. The vehicle context data may include fuel consumption per second, a current vehicle speed, a shift-speed currently engaged, acceleration of the vehicle, an accelerator pedal position, a brake pedal position, a current vehicle position, an engine speed, and the like. The vehicle speed may be directly detected by a vehicle speed sensor installed separately, or may be calculated based on a global positioning system (GPS) signal received by the navigation system. The acceleration of the vehicle may be directly detected by an acceleration sensor installed separately from the vehicle speed sensor, or may be calculated by differentiating the vehicle speed.

The vehicle context data manager 120 may include a data buffer, and a data filter, and may be configured to selectively collect data by which the driving propensity of a driver is able to be determined among the vehicle context data collected by the data collector 110. In addition, the vehicle context data manager 120 may be configured to provide an abstraction hierarchy, and convert the vehicle context data into a form defined by an application programming interface (API) to allow the management server 200 to recognize the vehicle context data. The vehicle context data manager 120 may be configured to calculate a fuel efficiency influencing factor based on the vehicle context data. The fuel efficiency influencing factor may be a factor that influences fuel efficiency, and may include a driving time after starting an engine, an idling time, a preheating time, a rapid acceleration time, a rapid deceleration time, a driving distance after starting the engine, and the like.

The vehicle context data manager 120 may further be configured to divide the driving time after starting the engine into n pieces based on the fuel consumption per second. For example, the vehicle context data manager 120 may be configured to divide the driving time after starting the engine into a first time, a second time, and a third time based on the fuel consumption per second. For example, the first time may be a driving time calculated when the fuel consumption per second is lower than a first threshold value (e.g., when fuel efficiency is substantially high). The second time may be a driving time calculated when the fuel consumption per second is between the first threshold value and a second threshold value (e.g., a normal case). The third time may be a driving time calculated when the fuel consumption per second is greater than the second threshold value (e.g., when fuel efficiency is substantially low).

The first threshold value and the second threshold value may be set as values that those skilled in the art may determine in consideration of vehicle types. Furthermore, the driving time after starting the engine may be further subdivided, if necessary. Accordingly, the vehicle context data manager 120 may be implemented as at least one microprocessor operated by a predetermined program, and the predetermined program may include a series of commands for performing a method of managing the vehicle context data.

The memory 130 may be configured to store a vehicle type, a driver identification (ID), and the like. In addition, the memory 130 may be configured to store the data collected by the data collector 110 and/or the vehicle context data manager 120. The communicator 140 may be configured to transmit the fuel efficiency influencing factor calculated by the vehicle context data manager 120 to the management server 200 via a wired or wireless communication network. In addition, the communicator 140 may be configured to receive the fuel efficiency analysis data from the management server 200.

The input interface 150 may be configured to receive a command for informing fuel efficient driving from the driver, and transmit the command to the terminal controller 170. The input interface 150 may be implemented as a touch screen, a keypad, or the like. As the output display 160, a liquid crystal display (LCD) or the like may be used, and the output display 160 may be configured to visually display a fuel efficiency analysis result to the driver.

The terminal controller 170 may be configured to operate the driver terminal 100. The terminal controller 170 may be configured to operate the output display 160 to inform the driver of the fuel efficient driving. Accordingly, the terminal controller 170 may be implemented as at least one microprocessor operated by a predetermined program, and the predetermined program may include a series of commands for performing each step included in a method for informing the fuel efficient driving.

The management server 200 may include a communication unit 210, an authentication unit 220, a driving propensity analyzing unit 230, a driving propensity comparing unit 240, a database 250, and a controller 260. In particular, the communication unit 210 may be configured to receive the fuel efficiency influencing factor from the driver terminal 100 via a wired or wireless communication network. The received fuel efficiency influencing factor may be stored and classified in the database 250. In other words, as the data received from a plurality of driver terminals 100 increases, the data accumulated in the database 250 increases. The authentication unit 220 may be configured to perform driver authentication in response to an authentication request of the driver terminal 100. The authentication unit 220 may be configured to perform an authentication procedure based on driver authentication information registered in advance and the received driver ID. After performing the authentication procedure, the fuel efficiency influencing factor for each driver and/or for each vehicle type may be stored in the database 250.

The driving propensity analyzing unit 230 may be configured to analyze a driving propensity of the driver based on the data accumulated in the database 250, and produce fuel efficiency analysis data. The fuel efficiency analysis data may be stored in the database 250. The driving propensity analyzing unit 230 may be configured to convert the fuel efficiency analysis data into a form of an API for a fuel efficiency related service. The fuel efficiency analysis data may include a fuel efficient driving index, a first time ratio, a second time ratio, a third time ratio, an idling time ratio, a preheating time ratio, a rapid acceleration time ratio, a rapid deceleration time ratio, and the like. The driving propensity analyzing unit 230 may be configured to calculate the fuel efficient driving index, the first time ratio, the second time ratio, the third time ratio, the idling time ratio, the preheating time ratio, the rapid acceleration time ratio, and the rapid deceleration time ratio, for each predetermined period (e.g., daily, weekly, monthly, or yearly).

An example in which the driving propensity analyzing unit 230 calculates the fuel efficient driving index is shown in Table 1, but the present invention is not necessarily limited thereto. The examples shows that the first time is about 200 sec, the second time is about 100 sec, the third time is about 40 sec, a total driving time is about 340 sec, and the idling time is about 60 sec will be described below.

TABLE 1

| Division | Time (sec) | Time after subtracting idling time (sec) | Percentage (%) | Indexation reference coefficient | Fuel efficient driving index |
|---|---|---|---|---|---|
| First time | 200 | 200 | 71.42857143 | 1.1 | 78.571429 |
| Second time | 100 | 40 (100 − 60) | 14.28571429 | 0.8 | 11.428571 |
| Third time | 40 | 40 | 14.28571429 | −0.2 | −2.857143 |
| Total driving time | 340 | 280 | 100 | | 87.142857 |
| Idling time | 60 | | | | |

The driving propensity analyzing unit 230 may be configured to calculate the first time ratio (71.42857143), the second time ratio (14.28571429), and the third time ratio (14.28571429) based on the total driving time. In particular, the driving propensity analyzing unit 230 may be configured to consider the idling time when the second time ratio is calculated. Therefore, as the idling time increases, a low fuel efficient driving index may be calculated.

Further, the driving propensity analyzing unit 230 may be configured to calculate the fuel efficient driving indexes by applying indexation reference coefficients set differently based on the first time, the second time, and the third time. For example, an indexation reference coefficient set to the first time may be about 1.1, an indexation reference coefficient set to the second time may be about 0.8, and an indexation reference coefficient set to the third time may be about −0.2. Particularly, the indexation reference coefficient may be set as a value that those skilled in the art may determine.

In addition, the driving propensity analyzing unit 230 may be configured to set a maximum value and a minimum value of the fuel efficient driving index. For example, the maximum value of the fuel efficient driving index may be about 100, and the minimum value of the fuel efficient driving index may be about 60. Therefore, the fuel efficient driving index may be calculated as about 100 when the fuel efficient driving index is greater than about 100 and as about 60 when the fuel efficient driving index is less than about 60. The driver may modify the driver's driving propensity to increase the driver's fuel efficient driving index. Accordingly, the driving propensity analyzing unit 230 may be implemented as at least one microprocessor operated by a predetermined program, and the predetermined program may include a series of commands for performing a method of analyzing the driving propensity of the driver.

The driving propensity comparing unit 240 may be configured to compare the fuel efficiency analysis data of an individual driver and the fuel efficiency analysis data of drivers having the same vehicle types, and produce first comparison data. In addition, the driving propensity comparing unit 240 may be configured to compare the fuel efficiency analysis data of the individual driver and the fuel efficiency analysis data of a plurality of the drivers, and produce second comparison data. In other words, by grouping the drivers base on a predetermined reference, the driving propensity comparing unit 240 may be configured to produce data obtained by comparing the driving propensity of the individual driver and the driving propensities of the plurality of the drivers.

For example, the driving propensity comparing unit 240 may be configured to set rankings of the plurality of the drivers based on the first time ratio, and the individual driver may confirm the driver's ranking to determine whether to perform the fuel efficient driving. In addition, the driving propensity comparing unit 240 may be configured to produce data obtained by comparing the fuel efficient driving index of the individual driver and an average fuel efficient driving index of the drivers having the same vehicle types. Accordingly, the driving propensity comparing unit 240 may be implemented as at least one microprocessor operated by a predetermined program, and the predetermined program may include a series of commands for performing a method of comparing the driving propensity of the driver.

The controller 260 (e.g., a first controller or a management controller) may be configured to operate the management server 200. The controller 260 may be configured to provide the fuel efficiency analysis data to the driver terminal 100 via the communication unit 210. In addition, the controller 260 may be configured to provide the fuel efficiency analysis data via a web page. Accordingly, the controller 260 may be implemented as at least one microprocessor operated by a predetermined program, and the predetermined program may include a series of commands for performing each step included in a method for informing the fuel efficient driving.

Figure 2:
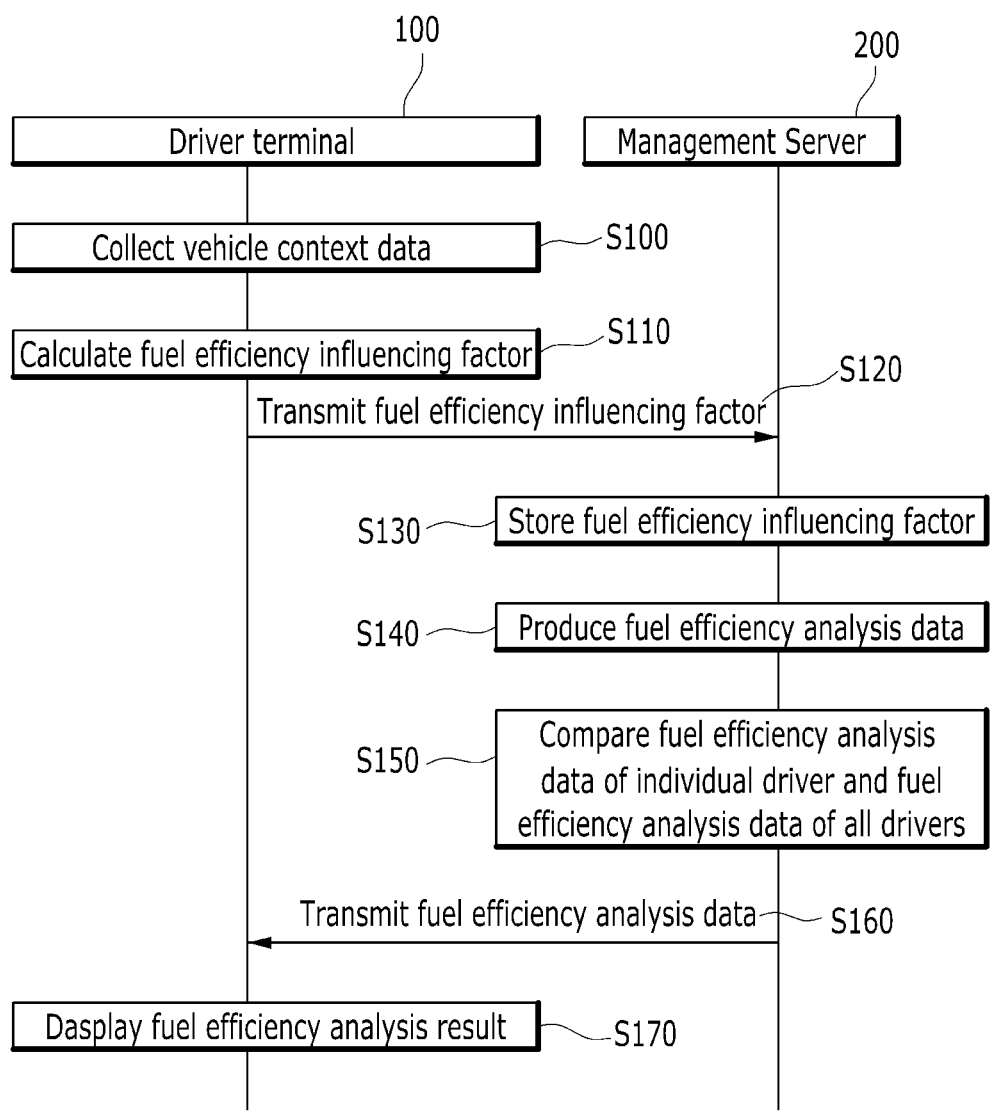
FIG. 2 is an exemplary flowchart of a method for informing fuel efficient driving according to an exemplary embodiment of the present invention.

FIG. 2 is an exemplary flowchart of a method for informing fuel efficient driving regarding fuel efficiency according to an exemplary embodiment of the present invention. The data collector 110 may be configured to collect vehicle context data that includes fuel consumption per second (S100). The vehicle context data may further include a current vehicle speed, a shift-speed currently engaged, acceleration of a vehicle, an accelerator pedal position, a brake pedal position, a current vehicle position, an engine speed, and the like.

Based on the vehicle context data collected by the data collector 110, the vehicle context data manager 120 may be configured to calculate a fuel efficiency influencing factor that includes a driving time after starting the engine (S110). The fuel efficiency influencing factor may further include a first driving time, a second driving time, a third driving time, an idling time, a preheating time, a rapid acceleration time, a rapid deceleration time, a driving distance after starting the engine, and the like. The communicator 140 may be configured to transmit the fuel efficiency influencing factor in conjunction with the communication unit 210 (S120). Additionally, the controller 260 may be configured to store the fuel efficiency influencing factor in the database 250 (S130).

The driving propensity analyzing unit 230 may be configured to analyze a driving propensity of the driver based on the data accumulated in the database 250, and produce fuel efficiency analysis data (S140). The fuel efficiency analysis data may include the fuel efficient driving index, the first time ratio, the second time ratio, the third time ratio, the idling time ratio, the preheating time ratio, the rapid acceleration time ratio, the rapid deceleration time ratio, and the like. The driving propensity analyzing unit 230 may also be configured to calculate the fuel efficient driving index based on a total driving time, a first driving time, a second driving time, a third driving time, an idling time, and a predetermined indexation reference coefficient.

Further, the driving propensity comparing unit 240 may be configured to compare the fuel efficiency analysis data of the individual driver and the fuel efficiency analysis data of a plurality of the drivers (S150). In addition, the driving propensity comparing unit 240 may be configured to compare the fuel efficiency analysis data of the individual driver and the fuel efficiency analysis data of the drivers have the same vehicle type. In other words, by grouping the drivers based on a predetermined reference, the driving propensity comparing unit 240 may be configured to produce data obtained by comparing the driving propensity of the individual driver and the driving propensities of a plurality of the drivers.

The communication unit 210 may be configured to transmit the fuel efficiency analysis data in conjunction with the communicator 140 (S160). In addition, the communication unit 210 may be configured to transmit the first comparison data and/or the second comparison data in conjunction with the communicator 140. The output display 160 may be configured to display a fuel efficiency analysis result based on an operate of the terminal controller 170 (S170). In addition, the management controller 260 may be configured to provide the fuel efficiency analysis result via a web page. In particular, based on the fuel efficiency analysis data, the terminal controller 170 may be configured to display a warning to the driver by operating the output display 160 when a driving state of the driver is not a fuel efficient driving state. In other words, reference values, which may be references for determining the fuel efficient driving state, may be set with respect to the fuel efficient driving index, the first time ratio, the second time ratio, the third time ratio, the idling time ratio, the preheating time ratio, the rapid acceleration time ratio, and the rapid deceleration time ratio, respectively. The reference values, which may be references for determining the fuel efficient driving state, may be set as values that those skilled in the art may determine.

For example, the terminal controller 170 may be configured to display a warning to the driver by operating the output display 160 when the fuel efficient driving index is less than a predetermined first reference value. In addition, the terminal controller 170 may be configured to display a warning to the driver by operating the output display 160 when the idling time ratio is greater than a predetermined second reference value. Therefore, the driver may recognize a reason that affects current fuel efficiency (e.g., may determine what influencing factor is affecting the fuel efficiency). The terminal controller 170 may be configured to release the warning display based on an input of the driver via the input interface 150.

FIGS. 3 to 7 are exemplary views illustrating fuel efficiency analysis results displayed to the driver by the output display 160 according to the exemplary embodiment of the present invention.

Figure 3:
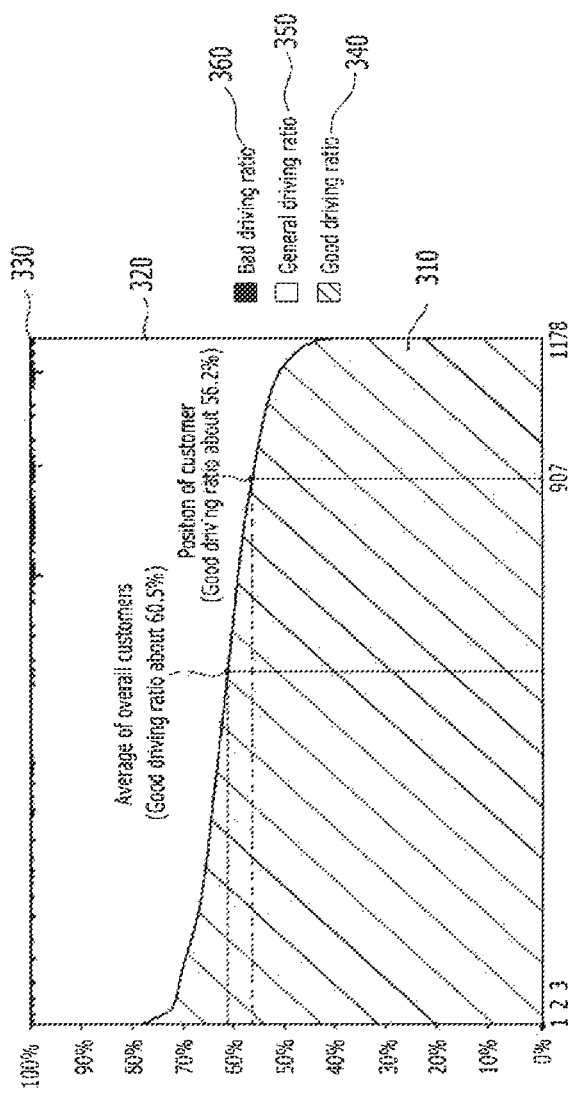
FIG. 3 is an exemplary view illustrating rankings of a plurality of drivers based on a first time ratio according to the exemplary embodiment of the present invention.

FIG. 3 is an exemplary view illustrating rankings of all the drivers in accordance with the first time ratio according to the exemplary embodiment of the present invention. Referring to FIG. 3, the output display 160 may be configured to divide a graph to display a section 310 that corresponds to the first time ratio as a green color, a section 320 that corresponds to the second time ratio as a yellow color, and a section 330 that corresponds to the third time ratio as a red color. The various sections may also be represented in any other manner that differentiates the sections. The output display 160 may be configured to display the section 310 that corresponds to the first time ratio as a "good driving ratio" 340, the section 320 that corresponds to the second time ratio as a "general driving ratio" 350, and the section 330 that corresponds to the third time ratio as a "bad driving ratio" 360. The driver may compare the driver's first time ratio with an average that corresponds to the first time ratio of a plurality of the drivers, and determine the driver's ranking.

Figure 4:
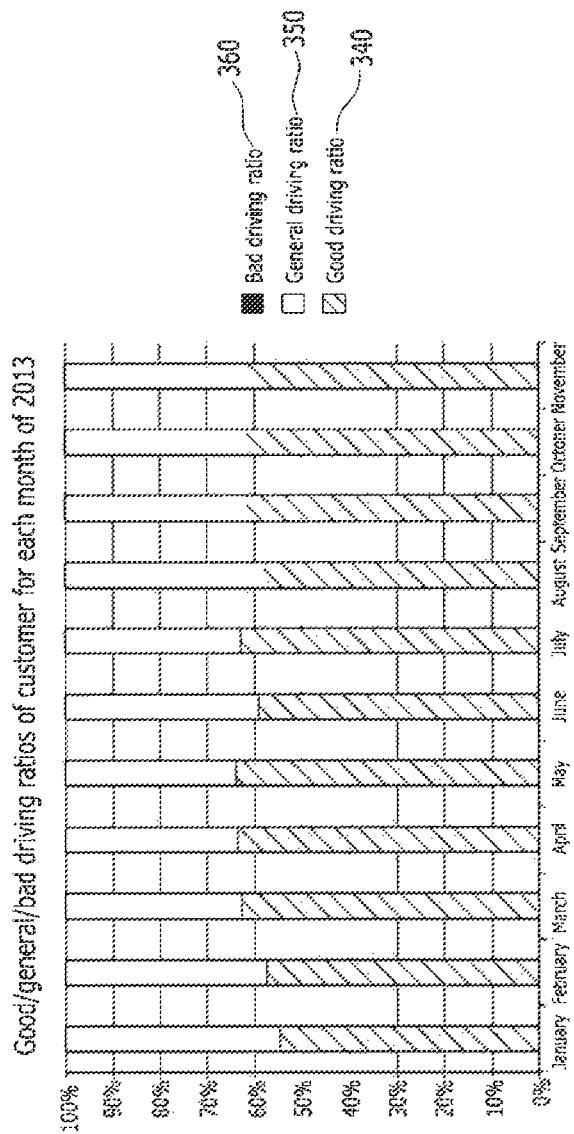
FIG. 4 is an exemplary view illustrating a progress of a first time ratio for each month according to the exemplary embodiment of the present invention.

FIG. 4 is an exemplary view illustrating a progress of the first time ratio for each month according to the exemplary embodiment of the present invention. Referring to FIG. 4, the output display 160 may be configured to display the first time ratio, the second time ratio, and the third time ratio of the driver for each month as a bar graph. Therefore, the driver may determine a progress of the driver's first time ratio for each month.

Figure 5:
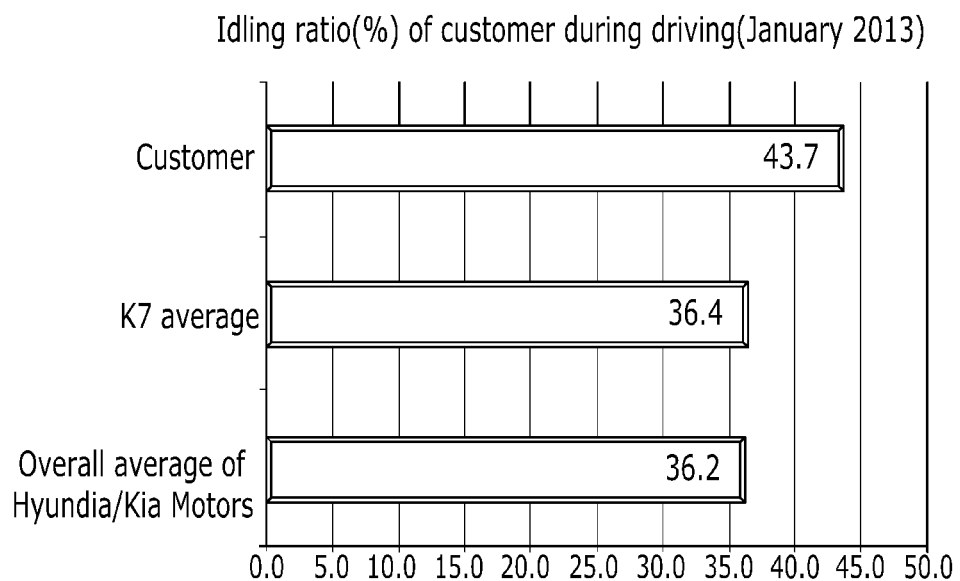
FIG. 5 is an exemplary view illustrating an idling ratio of an individual driver and an average idling ratio of a plurality of drivers according to the exemplary embodiment of the present invention.

FIG. 5 is an exemplary view illustrating an idling ratio of the individual driver and an average idling ratio of a plurality of the drivers according to the exemplary embodiment of the present invention. Referring to FIG. 5, the output display 160 may be configured to display an idling ratio of the individual driver, an average idling ratio of the drivers having the same vehicle type, and an average idling ratio of a plurality of drivers having vehicles manufactured by the same manufacturer. Therefore, the driver may determine an average idling ratio of the drivers who have different types of vehicles and an average idling ratio of the drivers who have the same type of vehicles.

Figure 6:
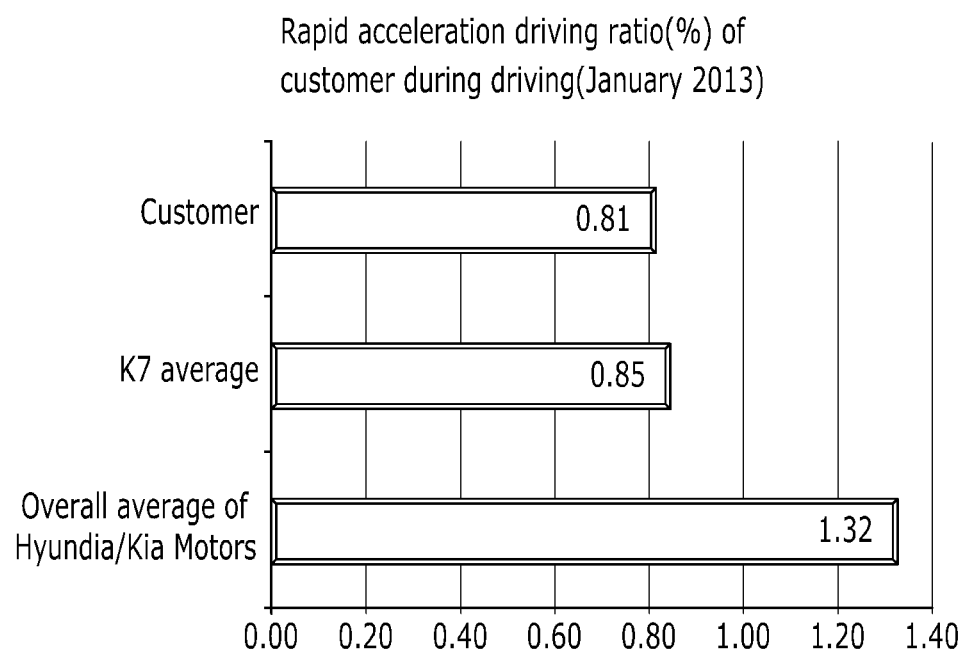
FIG. 6 is an exemplary view illustrating a rapid acceleration driving ratio of an individual driver and an average rapid acceleration driving ratio of a plurality of drivers according to the exemplary embodiment of the present invention.

FIG. 6 is an exemplary view illustrating a rapid acceleration driving ratio of the individual driver and an average rapid acceleration driving ratio of a plurality of the drivers according to the exemplary embodiment of the present invention. Referring to FIG. 6, the output display 160 may be configured to display a rapid acceleration driving ratio of the individual driver, an average rapid acceleration driving ratio of the drivers having the same vehicle type, and an average rapid acceleration driving ratio of a plurality of drivers having vehicles manufactured by the same manufacturer.

Figure 7:
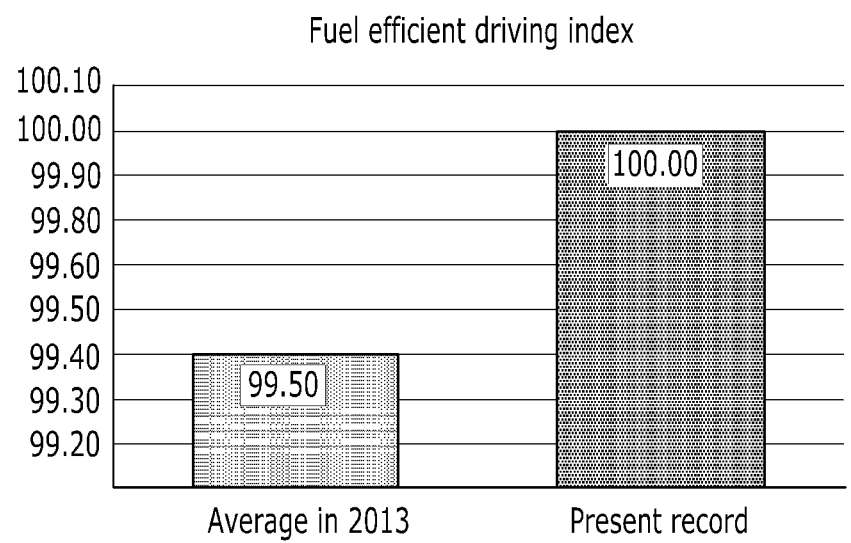
FIG. 7 is an exemplary view illustrating the past record and the present record of a driver according to the exemplary embodiment of the present invention.

FIG. 7 is an exemplary view illustrating the past record and the present record of the driver according to the exemplary embodiment of the present invention. Referring to FIG. 7, the output display 160 may be configured to display the past record and the present record based on the fuel efficiency analysis result of the individual driver. While FIG. 7 illustrates only a bar graph for comparing the past record and the present record of the fuel efficient driving index, the output display 160 may be configured to display the past record and the present record of the idling time ratio, the preheating time ratio, the rapid acceleration time ratio, the rapid deceleration time ratio, the first time ratio, the second time ratio, the third time ratio, and the like. In addition, the output display 160 may be configured to display the highest record and the present record based on the fuel efficiency analysis result of the individual driver. Therefore, the driver may be guided to renew the driver's highest record.

As described above, according to the exemplary embodiment of the present invention, the driver may be provided with the past record and the present record of the driver, or a result obtained by comparing the driver with other drivers, and may have an active fuel efficient driving habit by determining whether the driver's driving propensity is advantageous to perform the fuel efficient driving regarding fuel efficiency. In addition, the driver may be informed of information regarding factors that influence fuel efficiency, such as the idling time, the rapid acceleration time, and the rapid deceleration time, and may be guided to perform the fuel efficient driving based on those factors.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A method for informing fuel efficient driving comprising:
    collecting, by a controller, vehicle context data that includes fuel consumption per second;
    calculating, by the controller, a fuel efficiency influencing factor that includes a driving time after starting an engine based on the vehicle context data;
    storing, by the controller, the fuel efficiency influencing factor in a database;
    analyzing, by the controller, a driving propensity based on the data stored in the database and producing fuel efficiency analysis data that includes a fuel efficient driving index; and
    displaying, by the controller, a fuel efficiency analysis result based on the fuel efficiency analysis data, wherein
    the fuel efficiency influencing factor further includes at least one of an idling time, a preheating time, a rapid acceleration time, a rapid deceleration time, and a driving distance after starting the engine,
    the driving time after starting the engine is divided into n pieces based on the fuel consumption per second,
    when the driving time after starting the engine is divided into a first time, a second time, and a third time based on the fuel consumption per second, the fuel efficiency analysis data further includes a first time ratio, a second time ratio, and a third time ratio, and
    the fuel efficient driving index is calculated based on the first time, the second time, the third time, the idling time, and indexation reference coefficients which are set differently based on the first time, the second time, and the third time.

2. The method of claim 1, further comprising:
    producing, by the controller, first comparison data by comparing the fuel efficiency analysis data of a driver and the fuel efficiency analysis data of a plurality of drivers having a same vehicle type; and
    displaying, by the controller, the fuel efficiency analysis result based on the fuel efficiency analysis data and the first comparison data.

3. The method of claim 1, further comprising:
    producing, by the controller, second comparison data by comparing the fuel efficiency analysis data of a driver and the fuel efficiency analysis data of a plurality of drivers; and
    displaying, by the controller, the fuel efficiency analysis result based on the fuel efficiency analysis data and the second comparison data.

4. The method of claim 1, further comprising:
    displaying, by the controller, a warning based on the fuel efficiency analysis data and a predetermined reference value, wherein the predetermined reference value is a reference for determining the fuel efficient driving, when a driving state of the driver is not a fuel efficient driving state.

5. The method of claim 1, wherein the fuel efficiency analysis data further includes at least one of an idling time ratio, a preheating time ratio, a rapid acceleration time ratio, and a rapid deceleration time ratio.

6. A system for informing fuel efficient driving comprising:
    a terminal controller configured to:
        calculate a fuel efficiency influencing factor that includes a driving time after starting an engine; and
        transmit the fuel efficiency influencing factor to an exterior; and
    a management controller configured to:
        receive the fuel efficiency influencing factor;
        analyze a driving propensity based on data stored in a database;
        produce fuel efficiency analysis data that includes a fuel efficient driving index; and
        provide the fuel efficiency analysis data via at least one of a driver controller and a web page, wherein
    the fuel efficiency influencing factor further includes at least one of an idling time, a preheating time, a rapid acceleration time, a rapid deceleration time, and a driving distance after starting the engine,
    the driving time after starting the engine is divided into n pieces based on the fuel consumption per second,
    when the driving time after starting the engine is divided into a first time, a second time, and a third time based on the fuel consumption per second, the fuel efficiency analysis data further includes a first time ratio, a second time ratio, and a third time ratio, and
    the management controller is further configured to calculate the fuel efficient driving index based on the first time, the second time, the third time, the idling time, and indexation reference coefficients which are set differently based on the first time, the second time, and the third time.

7. The system of claim 6, wherein: the driver controller is further configured to:
    collect vehicle context data that includes fuel consumption per second;
    selectively collect data by which the driving propensity is determined among the vehicle context data, and calculate the fuel efficiency influencing factor;
    transmit the fuel efficiency influencing factor to the management controller;
    display a fuel efficiency analysis result; and
    operate the output display to display the fuel efficiency analysis result based on the fuel efficiency analysis data.

8. The system of claim 7, wherein the terminal controller is configured to display a warning based on the fuel efficiency analysis data and a predetermined reference value, wherein the predetermined reference value is a reference for determining the fuel efficient driving, when a driving state of the driver is not a fuel efficient driving state.

9. The system of claim 6, wherein the management controller is configured to:
    perform communication with the driver controller;
    perform driver authentication in response to an authentication request from the driver controller;
    store the fuel efficiency influencing factor received from the driver controller;

analyze the driving propensity based on the data stored in the database and produce the fuel efficiency analysis data; and transmit the fuel efficiency analysis data to the driver controller.

10. The system of claim 9, wherein the management controller is further configured to:

produce first comparison data by comparing the fuel efficiency analysis data of a driver and the fuel efficiency analysis data of a plurality of drivers having a same vehicle type; and produce second comparison data by comparing the fuel efficiency analysis data of the driver and the fuel efficiency analysis data of a plurality of drivers.

11. A non-transitory computer readable medium containing program instructions executed by a controller, the computer readable medium comprising:

program instructions that collect vehicle context data that includes fuel consumption per second;

program instructions that calculate a fuel efficiency influencing factor that includes a driving time after starting an engine based on the vehicle context data;

program instructions that store the fuel efficiency influencing factor in a database;

program instructions that analyze a driving propensity based on the data stored in the database and producing fuel efficiency analysis data that includes a fuel efficient driving index; and program instructions that display a fuel efficiency analysis result based on the fuel efficiency analysis data, wherein the fuel efficiency influencing factor further includes at least one of an idling time, a preheating time, a rapid acceleration time, a rapid deceleration time, and a driving distance after starting the engine, the driving time after starting the engine is divided into n pieces based on the fuel consumption per second, when the driving time after starting the engine is divided into a first time, a second time, and a third time based on the fuel consumption per second, the fuel efficiency analysis data further includes a first time ratio, a second time ratio, and a third time ratio, and the fuel efficient driving index is calculated based on the first time, second time, the third time, the idling time, and indexation reference coefficients which are set differently based on the first time, the second time, and the third time.

12. The non-transitory computer readable medium of claim 11, further comprising:

program instructions that produce first comparison data by comparing the fuel efficiency analysis data of a driver and the fuel efficiency analysis data of a plurality of drivers having a same vehicle type; and program instructions that display the fuel efficiency analysis result based on the fuel efficiency analysis data and the first comparison data.

13. The non-transitory computer readable medium of claim 11, further comprising:

program instructions that produce second comparison data by comparing the fuel efficiency analysis data of a driver and the fuel efficiency analysis data of a plurality of drivers; and program instructions that display the fuel efficiency analysis result based on the fuel efficiency analysis data and the second comparison data.

14. The non-transitory computer readable medium of claim 11, further comprising:

program instructions that display a warning based on the fuel efficiency analysis data and a predetermined reference value, wherein the predetermined reference value is a reference for determining the fuel efficient driving, when a driving state of the driver is not a fuel efficient driving state.

* * * * *